United States Patent [19]

Forst et al.

[11] Patent Number: 6,006,208
[45] Date of Patent: Dec. 21, 1999

[54] MICR LINE DECODING LOGIC SYSTEM

[75] Inventors: Jon K. Forst, New Castle; Robert G. Hall, Jr., Bear, both of Del.

[73] Assignee: First USA Bank, N.A., Wilmington, Del.

[21] Appl. No.: 09/047,451

[22] Filed: Mar. 25, 1998

[51] Int. Cl.[6] .................................................. G06F 19/00
[52] U.S. Cl. ............................................. 705/39; 705/40
[58] Field of Search ............................... 705/39, 35, 40, 705/45; 902/37, 40, 8, 24, 41; 235/375; 382/137

[56] References Cited

U.S. PATENT DOCUMENTS

| | | | |
|---|---|---|---|
| 5,053,607 | 10/1991 | Carlson et al. | 235/379 |
| 5,175,682 | 12/1992 | Higashiyama et al. | 364/408 |
| 5,237,620 | 8/1993 | Deaton et al. | 382/7 |
| 5,283,829 | 2/1994 | Anderson | 380/24 |
| 5,308,959 | 5/1994 | Cherry | 235/379 |
| 5,367,581 | 11/1994 | Abel et al. | 382/64 |
| 5,373,550 | 12/1994 | Campbell et al. | 379/100 |
| 5,383,113 | 1/1995 | Kight et al. | 364/401 |
| 5,412,190 | 5/1995 | Josephson et al. | 705/45 |
| 5,438,186 | 8/1995 | Nair et al. | 235/449 |
| 5,444,616 | 8/1995 | Nair et al. | 364/405 |
| 5,465,206 | 11/1995 | Hilt et al. | 364/406 |
| 5,479,532 | 12/1995 | Abel et al. | 382/137 |
| 5,484,988 | 1/1996 | Hills et al. | 235/379 |
| 5,504,677 | 4/1996 | Pollin | 364/408 |
| 5,652,786 | 7/1997 | Rogers | 379/91.01 |
| 5,679,938 | 10/1997 | Templeton et al. | 235/379 |
| 5,679,940 | 10/1997 | Templeton et al. | 235/380 |
| 5,727,249 | 3/1998 | Pollin | 705/40 |

*Primary Examiner*—Allen R. MacDonald
*Assistant Examiner*—Penny Caudle
*Attorney, Agent, or Firm*—Hunton & Williams

[57] ABSTRACT

The present invention is an automated system and method of initiating payments from a payor's checking account pursuant to the payor's authorization during a conversation via telephone, computer terminal or other telecommunication devices with a customer service representative. The automated system initiates a debit from the payor's checking account so that funds are automatically transferred to the payee without generating a paper bank draft check payable to the payee. Regardless as to where the payor banks, as long as the bank complies with American Banking Association Magnetic Ink Character Recognition Line regulations, the system automatically decodes the payor's checking account number and the bank's routing number.

15 Claims, 4 Drawing Sheets

| MICR LINE (WITHOUT ROUTING/TRANSIT AND ONUS SYMBOLS) | PERSONAL OR COMMERCIAL | CHECK NUMBER | ROUTING NUMBER | ACCOUNTING NUMBER |
|---|---|---|---|---|
| 1111111180123555555555 | PERSONAL | 123 | 111111118 | 5555555555 |
| 111111118555555555550123 | PERSONAL | 123 | 111111118 | 5555555555 |
| 5555555551111111180123 | PERSONAL | 123 | 111111118 | 5555555555 |
| 01231111111855555555555 | PERSONAL | 123 | 111111118 | 5555555555 |
| 0123555555551111111118 | PERSONAL | 123 | 111111118 | 5555555555 |
| 55555555501231111111118 | PERSONAL | 123 | 111111118 | 5555555555 |
| 11111111801234555555555555 | COMMERCIAL | 1234 | 111111118 | 5555555555 |
| 1111111185555555555001234 | COMMERCIAL | 1234 | 111111118 | 5555555555 |
| 55555555551111111118001234 | COMMERCIAL | 1234 | 111111118 | 5555555555 |
| 001234111111118555555555555 | COMMERCIAL | 1234 | 111111118 | 5555555555 |
| 00123455555555551111111118 | COMMERCIAL | 1234 | 111111118 | 5555555555 |
| 5555555555001234111111118 | COMMERCIAL | 1234 | 111111118 | 5555555555 |

FIG. 3

MICR LINE DECODING LOGIC SYSTEM

FIELD OF THE INVENTION

The invention generally relates to a system and method for collecting payments by which a payor can submit checking account information for a direct debit from his or her checking account during a telephone conversation with a customer service representative. More particularly, the system and process automatically decodes the Magnetic Ink Character Recognition (MICR) Line of a personal or commercial checking account based on information obtained directly from the customer.

BACKGROUND OF THE INVENTION

The present invention discloses a system by which a payor can submit checking account information to initiate a direct debit from his or her checking account during a telephone conversation with a customer service representative or via a computer terminal or other telecommunication devices. In order to perform the transaction, the system needs to gather two key pieces of information concerning the payor's checking account, the bank's routing/transit number (hereinafter "routing number") and the checking account number.

While most people know his or her checking account number, very few know his or her bank's routing number. However, this information is printed on every check within a checkbook. This information, along with the individual's check number, comprises the check's MICR Line.

The MICR line was developed to allow high speed, computer controlled processing of checks by banks. Banks utilize the magnetic ink characters printed on checks to decode and read the information printed on the checks in order to automatically process checks by standard sorting machines. The characters in the check's MICR line identify the payor's bank and Federal Reserve Bank District in which it is located, the payor's checking account number and the check's serial number. The actual position of the routing number, account number, and check number can vary from check to check, depending on the particular bank. According to the American Bankers Association (ABA) regulations for the content and placement of MICR Lines on checks, there are six possible combinations of these three numbers. The mechanical check reading devices that banks use to read checks rely on special symbols (the "routing" and "onus" symbols) to identify the three pieces of information in the MICR line. The routing symbols identifies the particular banking institution. The onus field contains the payor's account number and the number of the particular check. Since the information in these fields is printed in magnetic ink, when a check is manually inserted into a check reading device, the magnetic ink causes electronic current pulses in a circuit to be detected when "read" by a proper electronic read head.

While it is easy for a payor to read the actual numbers that are present in the MICR line, it is considerably more difficult to describe a routing or onus symbol through a telephone conversation. Unfortunately, MICR line information is not easily decipherable by those not educated in the intricacies of ABA regulations.

Before the creation of this invention, it was necessary to train representatives to "talk the payor through" the manual identification of the individual components of the MICR line. This older process required additional training for representatives and resulted in a high error rate in the proper identification of routing and checking account numbers. The present invention allows validation of the payor's account information to be performed on-line, while the representative is communicating with the payor. If the system detects an error during the on-line process, new information may be entered before the debit transaction is initiated. For those payors who do know his or her routing and account numbers, the process allows the direct entry of such information.

SUMMARY OF THE INVENTION

The challenge of this invention was to develop a system that could read only the string of numbers comprising the MICR line and extract the routing and checking account numbers. This information could then be used to initiate a direct debit to the payor's account.

Given the string of numbers in the MICR line (no symbols), the check number and whether the checking account is commercial or personal in nature, the present invention can reliably extract the routing and checking account numbers.

It is a general object of the present invention to provide a method for collecting funds from a payor's checking account when authorized.

It is a general object of the present invention to initiate an automatic debt directly from a consumer's checking account as a result of a telephone conversation.

Another important aspect of the present invention is the ability of the system to decode the MICR line to locate the payor's checking account number and the bank's routing number.

A further object of the system is the ability to consistently recognize a payor's checking account number and the bank's routing/transit number in a MICR line automatically, no matter which bank the check is drawn or whether the account is a personal or commercial account.

Still another object of the invention is to allow validation of the Routing Number while the representative is communicating with the payor. If an error is detected, the representative can request new information from the payor before the debit transaction is processed.

BRIEF DESCRIPTION OF THE DRAWINGS

FIG. 3 is a table which illustrates the possible format of MICR lines according to the present invention.

DETAILED DESCRIPTION OF PREFERRED EMBODIMENTS

The present invention is directed to a system and method for initiating payments from a payor's checking account pursuant to the payor's authorization during a conversation via telephone, computer terminal or other telecommunication devices with a customer service representative. The system (32) initiates direct debits from the payor's checking account (34) and automatically transfers the authorized funds to the payee's account.

In general, the payor informs the customer service (36) as to the character's of the payor's MICR line. The automated system (32) has a graphical user interface wherein the customer service representative enters the requested account information into the system during the conversation. The workstation of the system processes the information and retrieves the necessary information from the supporting data storing means (databases) to complete the transaction.

Once the account information is entered, the system extracts the payor's checking account number and the bank's routing number. The system is capable of decoding the payor's MICR line formats for all banks complying with ABA MICR Line regulations. The system automatically performs an on-line validation of the payor's routing number while the representative is talking to the payor. If the system detects an error, the system prompts the customer service representative to retrieve additional information from the payor before the debit transaction is initiated. Furthermore, for those payors who do know his or her routing/transit and account numbers, the system allows the direct entry of this information by the customer service representative.

Once the checking account number and the banking routing number have been identified, the system then initiates the debit through an external vendor. When verification of the availability of the authorized funds is completed by the external vendor, the authorized funds are automatically transferred from the payor's account and deposited into the payee's account. The entire transaction is completed without generating a paper bank draft check payable to the payor.

Figure 1:
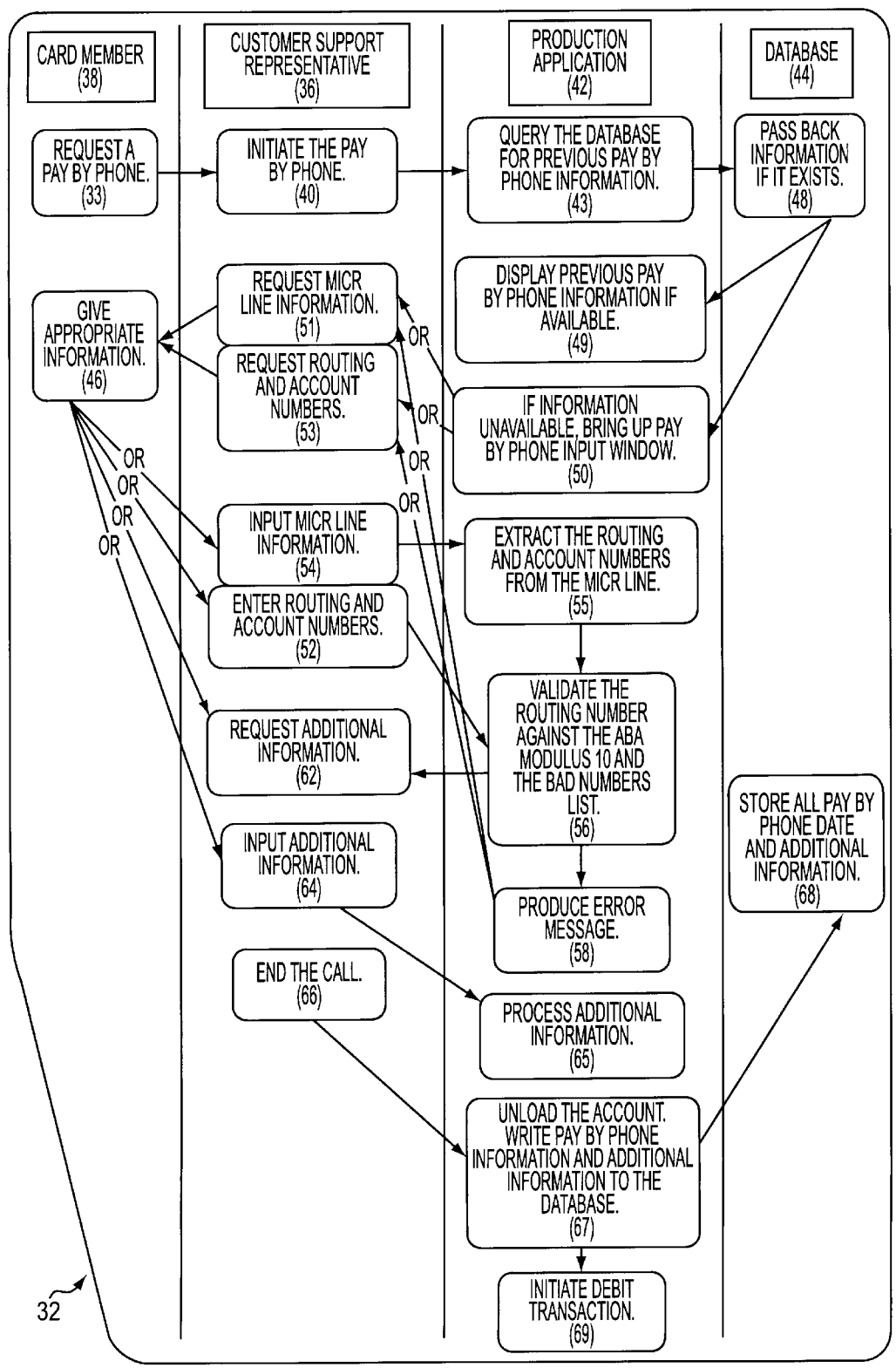
FIG. 1 is a flowchart of the present invention.

More specifically, see FIG. 1, initially the cardmember (38) or customer service representative (36) requests a pay by phone (33) transaction. The customer service representative (36) initiates the pay by phone transaction (40) by entering in the appropriate instructions into the keyboard of the computer or selecting the appropriate icons on the touch-screen of the graphic user interface of the computer. Once the request is entered into the computer, the production application (42) queries the database (43) for previous pay by phone information. If the database (44) contains previous pay by phone information for the current customer (38), the database (44) transfers the information (48) back to the production application (42). The previous pay by phone information is displayed on the computer screen (49). The system (32) automatically utilizes the previous phone information to initiate the debit transaction. If the database (44) does not contain previous pay by phone information for the current customer (38), the system automatically displays the pay by phone input window (50). Then the customer service representative (36) requests the customer's MICR line information (51) or requests whether the customer knows his or her routing and account numbers (53). The customer supplies the customer service representative with either the routing and account numbers or with the MICR line information(46). If the customer supplies his or her routing and account numbers (52), the information is entered directly into the system by the customer service representative (36). If the customer (38) provides the customer service representative (36) with MICR line information, the customer service representative enters the information (54) into the system (32) and the production application (42) extracts the routing and account number from the MICR line (55). The process of extracting the routing and account number from the MICR line will be discussed below in further details. Once the routing and account numbers have been entered directly into the system or calculated by the system, the production application (42) validates the routing number against the ABA Modulus 10 and the bad numbers list (56). The bad numbers list is a listing of routing and account numbers entered in the past which have resulted in failed transactions. If the validation process detects an error with the routing number, the system (32) displays an error message (58) and prompts the customer service representative (36) to request the customer's MICR line information (51) or request the routing and account number (53) again. The process of the present invention is reiterative; thus, it may be repeated by the customer service representative (36) as many times necessary in order to derive the correct routing and account information. If the validation process does not produce an error message, the production application (42) displays a message on the computed screen prompting the customer service representative to request additional information from the customer, such as the amount to be transferred (62). After the customer provides the appropriate responses (46), the customer service representative enters the customer's responses (64), the system (32) processes the information (65), and the customer service representative (36) ends the telephone call (66). The production application (42) unloads the account and writes the pay by phone information and the additional information (67) to the database (44). The database then stores all phone pay data and the additional information (68). Then the automated system (32) initiates the debit transaction (69) through an external vendor.

PROCESS TO DETERMINE MICR LINE

Figure 2A:
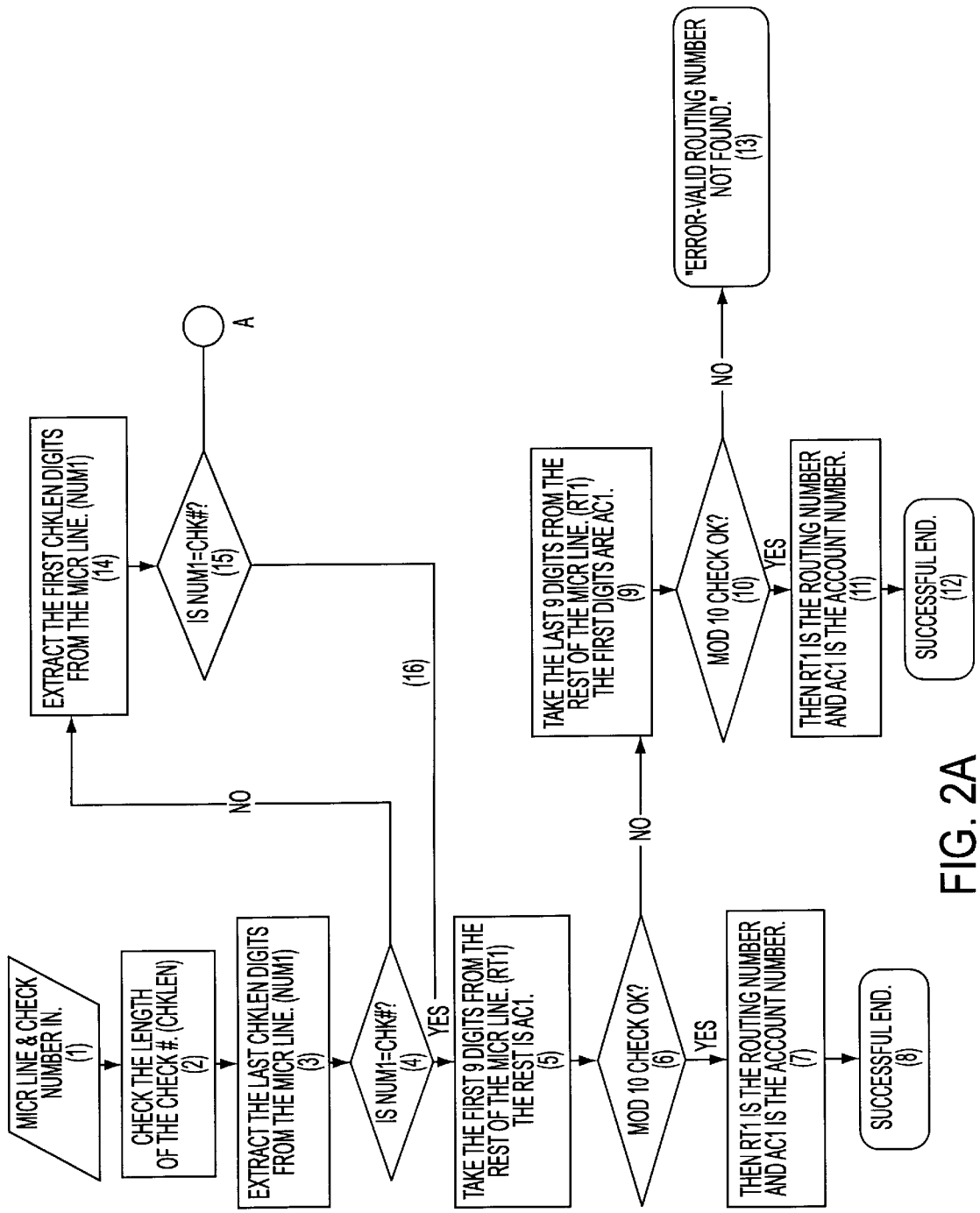
FIG. 2a is a flowchart of the MICR line validation process of the present invention.
Figure 2B:
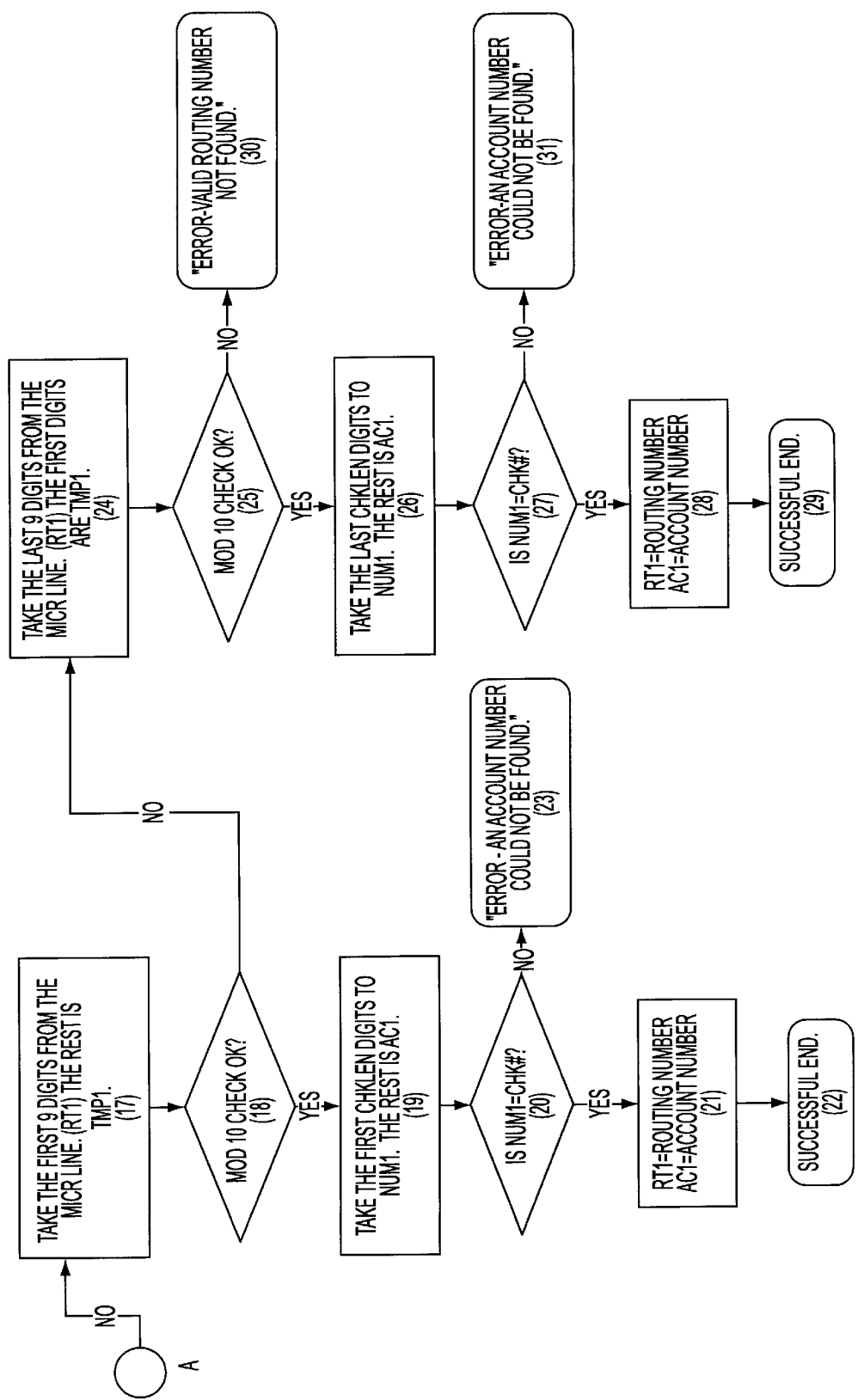
FIG. 2b is a flowchart of the MICR line validation process of the present invention.

According to the flowcharts in FIG. 2a and FIG. 2b, the automated process for determining the MICR Line is as follows:

1. Enter the MICR line, check number, and whether the account is personal or commercial.
2. Check the length of the check number (CHKLEN).
3. Extract the last CHKLEN digits from the MICR Line (NUM1).
4. Check to see whether NUM 1 equals the check number (CHK#).
5. If NUM1 equals the CHK#, the system (32) takes the first nine digits from the rest of the MICR Line and assigns them as the (RT1). The remaining digits are the AC1.
6. The system (32) performs a MOD 10 check.
7. If the answer to the MOD 10 check is "yes", then the RT1 is the routing number and AC1 is the account number.
8. The system has successful found the customer's routing and account number
9. Returning to step 6, if the answer to the MOD 10 check is no, then the system (32) takes the last nine digits from the rest of the MICR line and assigns them as the RT1. The first digits remaining are assigned as the AC1.
10. The MOD 10 check is performed again.
11. If the answer to the MOD 10 check is "yes", then RT1 is the routing number and AC1 is the account number.
12. The system (32) has successful found the customer's routing and account number.
13. Returning to step 10, if the answer to the MOD 10 is "no", then the system (32) displays an error message on the computer screen stating, "Error: Valid routing number not found."
14. Returning to step 4, if the NUM1 does not equal the CHK#, the system (32) then extracts the first CHKLEN digits from the MICR Line (NUM 1).
15. The system (32) checks once again to see whether NUM1 equals the CHK#.
16. If "yes", the system (32) returns the process to step 5.

17. Returning to step 15, if NUM1 does not equal the CHK#, the system (32) takes the first nine digits from the MICR line as RT1. The remaining digits are assigned as TMP1.

18. The MOD 10 check is performed again.

19. If the answer to the MOD 10 check is "yes", the system (32) takes the first CHKLEN digits to NUM1. The rest is assigned to AC1.

20. Check to see whether NUM 1 equals the check number (CHK#).

21. If the answer is "yes", then RT1 is the routing number and AC1 is the account number.

22. The system has successful found the customer's routing and account number.

23. Returning to step 20, if the answer is no, then the system (32) displays an error message on the computer screen stating, "Error: An account number could not be found."

24. Returning to step 18, if the answer to the MOD 10 check is "no", the system (32) takes the last nine digits from the MICR line and assigns them as the (RT1). The remaining first digits are assigned the (TMP1).

25. The system (32) performs a MOD 10 check.

26. If the MOD 10 check is "yes", then the system (32) assigns the last CHKLEN digits as NUM1. The remaining digits are assigned as AC1.

27. The system (32) checks to verify whether NUM1 equals CHK#.

28. If the answer is "yes", then RT1 is the routing number and AC1 is the account number.

29. The system has successful found the customer's routing and account number.

30. Returning to step 25, if the answer is "no", the system (32) displays an error message on the computer screen stating, "Error: Valid routing number not found."

31. Returning to step 27, if the answer is "no", then the system (32) displays an error message on the computer screen stating, "Error: An account number could not be found."

The process for determining the customer's routing and account number can be summarized as follows:

(a) First, the MICR line, check number and whether the account is personal or commercial are entered into the system (32).

(b) Second, the system (32) attempts to find the check number and remove it from the MICR Line by starting first on the right, then moving to the left. If the check number is found, go to step (c). If the check number is not found, go to step (d).

(c) Third, the system (32) attempts to find the routing number by starting first on the left, then move to the right. Since the routing number is always nine digits long, the process will only have to do two checks. The number passed from step (b) should contain an account number and a routing number. Logically, either the first nine digits, or the last nine digits should be the routing number. If the routing number is found (what remains is the account number), the process has successfully determined all three numbers. If the routing number was not determined, then an appropriate error message will be displayed.

(d) This step is reached when it is assumed that the check number is in the middle of the MICR Line. Logically, either the first nine digits or the last nine digits should be the routing number. If the routing number is found it is removed from the MICR Line and the rest of the number is passed to step (e). If the routing number cannot be determined, the system (32) outputs the appropriate error.

(e) Step (d) has found the routing number and has passed on a number containing the check and account numbers. From this number the process attempts to find and remove the check number leaving only the account number.

The table illustrated in FIG. 3 indicates the possible formats of MICR lines as entered by the payor service support representative into the system along with the nature of the account and the checking numbers. The system will identify the routing and account numbers for all possible orders of the checking routing and account numbers in the MICR line.

The MOD 10 is an abbreviation for "Modulus 10, Straight Summation" which is calculated using the first eight digits of the routing number to determine the ninth. This is a standard used by the American Bankers Association. The calculation is:

$$(3*P1)+(7*P2)+(1*P3)+(3*P4)+(7*P5)+(1*P6)+(3*P7)+(7*P8)=N$$

Where P1, P2, etc. is the position of the digit in the routing. N is the number generated. When the number is subtracted from the next higher integer divisible by 10, the check digit is produced.

Example: the routing number 111111118
$$(3*1)+(7*1)+(1*1)+(3*1)+(7*1)+(1*1)+(3*1)+(7*1)=32$$

The rationale for not performing a straight iteration (taking digits 1–9, then 2–10, then 3–11, etc.) is that every combination of eight numbers will produce a check digit. If the system (32) used this method, then the possibility exists that multiple valid numbers would be found in the MICR line.

The present invention has been described in relation to particular embodiments which are intended all respects to be illustrative rather than restrictive. Alternative embodiments will become apparent to those skilled in the art to which the present invention pertains without departing from its spirit and scope.

What is claimed is:

1. An automated system for initiating payment collections from a payor's checking account pursuant to the payor's authorization during a conversation via telephone, computer terminal or other telecommunication devices with a customer service representative, wherein said system includes a data entry processing center, a workstation, a graphical user interface, and a data storing means, the system comprising:

(a) at least one remote telecommunications device operable by a payor to be in communication with said graphical user interface operated by a customer service representative;

(b) a computer program initiating the automatic transfer of an authorized amount from said payor's account to a payee's account according to instructions received from said payor through said telecommunications device;

(c) means for automatically decoding the magnetic ink character recognition line on a check to determine the payor's checking account number and the routing number of the financial institution upon which the check is drawn, based upon account information received from said payor through said telecommunication device;

(d) means to perform a real-time, on-line validation of said payor's routing number;

(e) means to initiate said automatic transfer for said authorized amount directly from said payor's checking account to said payee's account, wherein said entire transaction is performed without generating a paper bank draft check.

2. The system of claim 1 wherein said magnetic ink character recognition line comprises a personal checking account number.

3. The system of claim 1 wherein said magnetic ink character recognition line comprises a commercial account number.

4. The system of claim 1 wherein said computer program performs a MOD 10 check.

5. The system of claim 4 wherein said routing number is validated against said MOD 10 check and a bad numbers list.

6. A method for initiating payment collections from a payor's checking account pursuant to the payor's authorization during a conversation via telephone, computer terminal or other telecommunication devices with a customer service representative, wherein the automated system includes a data entry processing center, a workstation, a graphical user interface, and a data storing means, the method comprising the steps of:

(a) inputting magnetic ink character recognition information into said system;

(b) extracting said payor's routing number and account number from said magnetic ink recognition information;

(c) calculating a MOD 10 number;

(d) accessing a database to obtain a listing of bad numbers; and (e) validating said routing number against said MOD 10 and said bad numbers list.

7. The system of claim 6 wherein said magnetic ink character recognition line comprises a personal checking account number.

8. The system of claim 6 wherein said magnetic ink character recognition line comprises a commercial account number.

9. An automated system for initiating payment collections from a payor's checking account pursuant to the payor's authorization during a conversation via telephone, computer terminal or other telecommunication devices with a customer service representative, wherein said system includes a data entry processing center, a workstation, a graphical user interface, and a data storing means, the system comprising:

(a) at least one remote telecommunications device operable by a payor to be in communication with said graphical user interface operated by a customer service representative;

(b) a computer program initiating the automatic transfer of an authorized amount from said payor's account to a payee's account according to magnetic ink character line information printed on a check provided by said payor to said customer service representative during said conversation;

(c) means for automatically decoding said magnetic ink character information line on a check to determine said payor's checking account number and routing number of the financial institution upon which the check is drawn;

(d) means to perform a real-time, on-line validation of said payor's routing number;

(e) means to initiate said automatic transfer for said authorized amount directly from said payor's checking account to a payee's account, wherein said entire transaction is performed without generating a paper bank draft check.

10. The system of claim 9 wherein said magnetic ink character recognition line comprises a personal checking account number.

11. The system of claim 9 wherein said magnetic ink character recognition line comprises a commercial account number.

12. The system of claim 9 wherein said computer program performs a MOD 10 check.

13. The system of claim 12 wherein said routing number is validated against said MOD 10 check and a bad numbers list.

14. An automated system for initiating payment collections from a payor's checking account pursuant to the payor's authorization during a conversation via telephone, computer terminal or other telecommunication devices with a customer service representative, wherein said system includes a data entry processing center, a workstation, a graphical user interface, and a data storing means, the system comprising:

(a) at least one remote telecommunications device operable by a payor to be in communication with said graphical user interface operated by a customer service representative;

(b) a computer program initiating the automatic transfer of an authorized amount from said payor's account to a payee's account according to instructions received from said payor through said telecommunications device;

(c) means for automatically decoding the magnetic ink character recognition line on a check to determine the payor's checking account number, the routing number of the financial institution upon which the check is drawn, and check number of said check based upon account information received from said payor through said telecommunication device;

(d) means to perform a real-time, on-line validation of said payor's routing number;

(e) means to initiate said automatic transfer for said authorized amount directly from said payor's checking account to said payee's account, wherein said entire transaction is performed without generating a paper bank draft check.

15. A method for initiating payment collections from a payor's checking account pursuant to the payor's authorization during a conversation via telephone, computer terminal or other telecommunication devices with a customer service representative, wherein the automated system includes a data entry processing center, a workstation, a graphical user interface, and a data storing means, the method comprising the steps of:

(a) inputting magnetic ink character recognition information into said system;

(b) extracting said payor's routing number, account number, and check number from said magnetic ink recognition information;

(c) calculating a MOD 10 number;

(d) accessing a database to obtain a listing of bad numbers; and validating said routing number against said MOD 10 and said bad numbers list.

* * * * *